UNITED STATES PATENT OFFICE.

AUGUST DUPRÉ AND CECIL NAPIER HAKE, OF WESTMINSTER, ENGLAND.

DISINFECTANT.

SPECIFICATION forming part of Letters Patent No. 383,559, dated May 29, 1888.

Application filed September 10, 1887. Serial No. 249,361. (No specimens.)

*To all whom it may concern:*

Be it known that we, AUGUST DUPRÉ and CECIL NAPIER HAKE, both at present residing at Westminster Hospital Medical School, Caxton street, Westminster S. W., England, have invented new and useful Improvements in the Preparation of Disinfectants, Deodorants, and Antiseptics, of which the following is a full, clear, and exact description.

The manganates and permanganates of the alkalies have long been used as disinfectants, the value of the substance as a disinfectant depending for the most part upon the percentage of permanganate or of manganate present. The permanganates of the alkalies are for most purposes too expensive for ordinary use, and it has been the practice to use a manganate of the alkalies, and to add to it when in use free sulphuric acid, thus producing a reaction and causing the formation of permanganate. This method of use is open to many objections which are obvious. We are aware that it has been attempted to surmount some of these objections by using a mixture of manganate of soda with a bisulphate of soda. This is open to the objection that the compound is deliquescent and that it is difficult to keep for any length of time. We have ascertained that a mixture of manganate of soda and either one or more of the following groups of sulphates—sulphate of magnesia, sulphate of zinc, sulphate of lime or of boracic acid—is not open to the objections of mixtures of free sulphuric acid or the bisulphate of soda with the manganate, while when moistened the result is fully as efficacious, and in the event of boracic acid being used the mixture is valuable not only as a disinfectant, but as an antiseptic.

For the purpose of making our disinfectant we consider the sulphates and boracic acid above named as a group of equivalents either one or more of which can be mixed with the manganate alkalies.

For commercial purposes we prefer to use sulphate of magnesia in the natural form of kisserit. We reduce it to a fine powder and mix it with commercial manganate of soda in the proportion of one part of kisserit to two of manganate. When the mixture is to be used, it is mixed with water, chemical decomposition at once sets in, and permanganate of soda is formed. Sulphate of lime may be used in place of kisserit, but the action of the mixture is imperfect and slow, although, perhaps, the compound is somewhat cheaper. Sulphate of zinc may be used in place of kisserit when the matter to be deodorized or disinfected contains sulphureted hydrogen, since the oxide of zinc formed during decomposition absorbs the sulphureted hydrogen, producing sulphate of zinc, and thus economizing manganate.

When an antiseptic as well as a disinfectant is desired, we use boracic acid in the proportion of two parts of manganate to one of commercial boracic acid, or else we treat borate of lime with an equivalent of sulphuric acid and use the result in equivalent proportions, as will be well understood.

Having now particularly described and ascertained the nature of the said invention and in what manner the same is to be performed, we declare that what we claim is—

As a new composition, a manganate of the alkalies combined with sulphate of magnesia, in about the proportions specified.

The foregoing specification of our improvements in the preparation of disinfectants, deodorants, and antiseptics signed by us this 17th day of August, 1887.

AUGUST DUPRÉ.
CECIL NAPIER HAKE.

Witnesses:
 WALTER J. SKERTEN,
 W. J. NORWOOD,
*Both of 17 Gracechurch Street, London, E. C.*